Patented June 5, 1951

2,555,353

UNITED STATES PATENT OFFICE 2,555,353

3-TERTIARYAMINOALKYL - 2 - PYRROLIDONES AND PROCESS FOR PREPARING SAME AND RELATED PRODUCTS

Philip Lucas, Middlesex County, Mass., and Robert L. Clarke, Albany County, and Aram Mooradian, Rensselaer County, N. Y., assignors to Sterling Drug Inc., New York, N. Y., a corporation of Delaware No Drawing. Application January 14, 1949, Serial No. 71,042

15 Claims. (Cl. 260—294.7)

This invention relates to heterocyclic compounds and a new method for their preparation. In particular this invention relates to 5–6 membered lactams and to their preparation from tertiary-amino carboxylic acids. Another aspect of the invention relates to new 2-pyrrolidone and 2-piperidone derivatives and intermediates thereof, which are useful as therapeutic agents, or can be used as intermediates for the preparation of compounds which possess physiological activity.

Our new process comprises reacting a halide of a strong acid with a tertiary-amino carboxylic acid, wherein 3–4 carbon atoms intervene between the carboxyl carbon atom and the tertiary amino nitrogen atom, and heating the tertiary amino carboxylic acid halide thus formed, whereby the said tertiary amino carboxylic acid halide is transformed into a 5–6 membered lactam.

The following will illustrate some specific applications of our new process:

(1) When alpha-phenyl-gamma-diethylaminobutyric acid (I) is treated with phosphorus trichloride and the resulting acid chloride (Ia), which need not be isolated, is heated, 1-ethyl-3-phenyl-2-pyrrolidone (Ib) is formed.

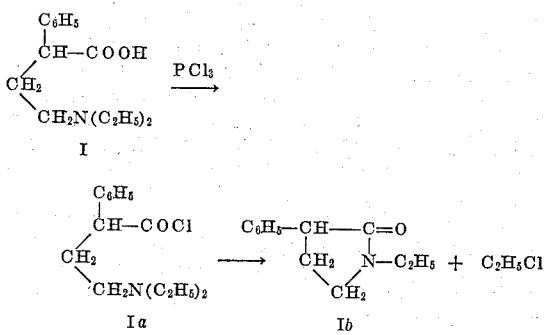

(2) When 1-methyl-piperidine-4-carboxylic acid (II) is treated with phosphorus trichloride and the resulting acid chloride (IIa) is heated, 1-methyl-3-(beta-chloroethyl) - 2 - pyrrolidone (IIb) is formed.

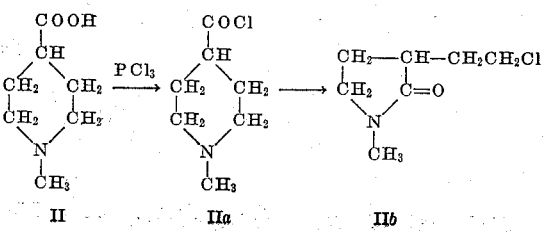

(3) When 2,2-diphenyl-4-(N-piperidyl)-butanoic acid (III) is treated with thionyl chloride and the resulting acid chloride (IIIa) is heated, 1-(5'-chloropentyl)-3,3-diphenyl-2 - pyrrolidone (IIIb) is formed.

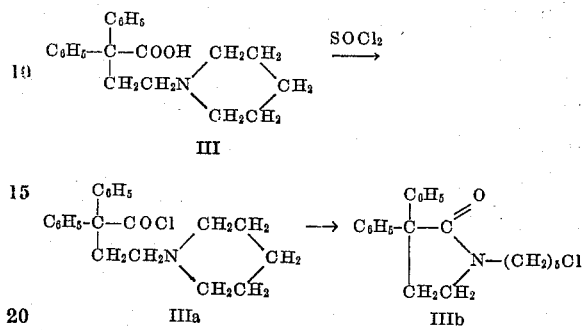

It will be seen that the reaction involves a rupture of a carbon-nitrogen bond in the tertiary-amino group. The rupture of this bond is accompanied by the simultaneous rupture of the carbonyl halide group of the acid halide portion of the molecule. In the redistribution of atomic links, the carbonyl group becomes joined to the nitrogen atom to form a lactam, while the halogen atom becomes joined to the carbon atom ruptured off the teriary amino nitrogen atom. If the carbon atom of the ruptured carbon-nitrogen bond is part of an alkyl group, said alkyl group along with the halogen atom will be liberated as the alkyl halide. If, however, the carbon-nitrogen bond is part of a heterocyclic ring the reaction will be, in effect, a rearrangement, all of the atoms of the original acid chloride molecule being retained with the halogen appearing as a haloaliphatic substituent in the resulting lactam.

The term halide as used above includes chloride and bromide. Because of the more ready availability of acid chloride forming reagents and the greater ease of preparation and handling of acid chlorides, we prefer to proceed through the acid chloride, and it will be as such that our invention will be described hereinafter. It is to be understood, however, that the formation of a lactam through the acid bromide is a part of the invention. For example, the phosphorus trichloride shown in the first equation above can readily be replaced by phosphorus tribromide and an analogous result is obtained.

The reaction can be carried out very simply by mixing the tertiary amino carboxylic acid with an excess of the acid chloride forming reagent without a solvent in the cold, followed by gradual heating. Acid chloride formation begins at a comparatively low temperature, usually about 30° C. When this is largely complete, the reaction mixture is heated to the reflux temperature, 70–90° C., of the acid chloride forming reagent which is present in excess, whereupon if the structural conditions permit formation of a 5-membered lactam the cyclization reaction occurs with elimination of an alkyl halide. Where the structural arrangement requires formation of a 6-membered lactam more drastic conditions are often needed to effect cyclization, and so then the excess acid chloride forming reagent must be removed, preferably by evaporation at reduced pressure, and the residue of acid chloride heated to the necessary temperature.

As acid chloride forming reagents, thionyl chloride and phosphorus trichloride are preferred. If the amino carboxylic acids used are disubstituted in the alpha-position, either thionyl chloride or phosphorus trichloride can be used in preparing the acid chloride; however it has been found that if one or two hydrogens are on the carbon alpha to the carboxyl group, phosphorus trichloride is more satisfactory than thionyl chloride.

However, in general any acid chloride forming reagent can be used. Such a reagent is the chloride of any strong acid, i. e., of an acid having a dissociation constant of at least about $10^{-3}$. Besides thionyl chloride and phosphorus trichloride, these reagents also include phosphorus pentachloride and oxalyl chloride.

When the tertiary-amino carboxylic acid used is a dialkylamino carboxylic acid, the process may be represented in the following manner.

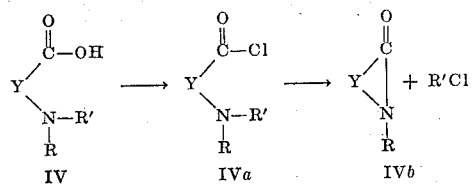

Compound IV represents an amino-carboxylic acid wherein R and R' are lower alkyl groups and Y is a chain of three or four carbon atoms which can be substituted by hydrocarbon radicals or by other groups such as alkoxy, aryloxy, acyloxy, or other groups which do not react readily with acid chlorides or acid chloride forming reagents. The acid is first warmed with the acid chloride forming reagent, whereupon the acid chloride IVa is formed, although this need not be isolated or purified. When this acid chloride is heated at temperatures ranging from 50–200° C., cyclization occurs with elimination of an alkyl chloride to form the heterocyle IVb, which is a 5–6 membered lactam, i. e. a 2-pyrrolidone or 2-piperidone, depending on whether the bridge Y has a chain of three or four carbon atoms respectively.

As we have already indicated, the formation of 2-pyrrolidones by our process proceeds under less drastic conditions than are required for the formation of 2-piperidones. For the particular embodiment of our process now under discussion, this is illustrated by the circumstance that alpha,alpha - diphenyl - gamma - diethylaminobutyryl chloride is converted to 1-ethyl-3,3-diphenyl-2-pyrrolidone at the reflux temperature of thionyl chloride, whereas alpha,alpha-diphenyl-delta-diethylaminovaleryl chloride (V) requires heating to a temperature of 150–170° C. for conversion to 1-ethyl-3,3-diphenyl-2-piperidone (Va).

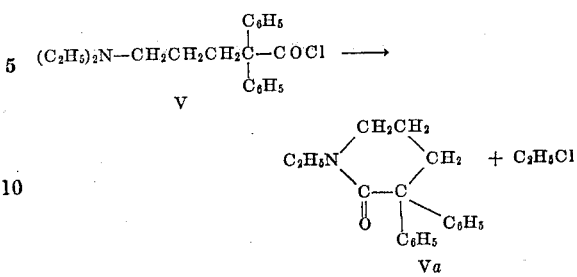

When R and R' in Formula IV are different alkyl groups, two routes of cyclization are theoretically possible, one in which RCl is eliminated and the other in which R'Cl is eliminated. We have found, however, that the smaller of the two alkyl groups is eliminated preferentially. For example, if R is ethyl and R' is methyl, cyclization produces about 75% of methyl chloride and 25% of ethyl chloride. When R is butyl and R' is methyl, the alkyl halide eliminated is methyl chloride exclusively.

A special case of this form of our process is provided when the acid of Formula IV is an alpha,alpha - bis(dialkylaminoalkyl) carboxylic acid wherein 3–4 carbon atoms intervene between the carboxyl carbon atom and at least one of the tertiary-amino nitrogen atoms. The application of our process to such an acid gives a series of new and useful 2-pyrrolidones or 2-piperidones, respectively, having the formulas:

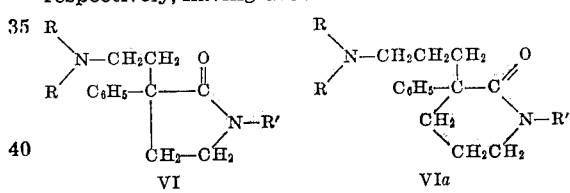

in which R and R' are lower alkyl groups. Many of the intermediates for their preparation by our process are also new and useful compounds.

The complete synthesis of compounds of the Formula VI is accomplished as follows. Alkylation of benzyl cyanide with a dialkylaminoethyl halide, R₂NCH₂CH₂X, where X is halogen (preferably chlorine or bromine) gives a disubstituted acetonitrile (VII). Further alkylation of VII with an aminoalkyl halide, R'₂NCH₂CH₂X, produces a completely substituted acetonitrile (VIII). Sodium amide is used as the basic condensing agent. If R and R' are the same, only one step is necessary to prepare VIII, using two moles of tertiary-aminoalkyl halide and two moles of sodium amide to one of benzyl cyanide so that the two groups may be introduced at once.

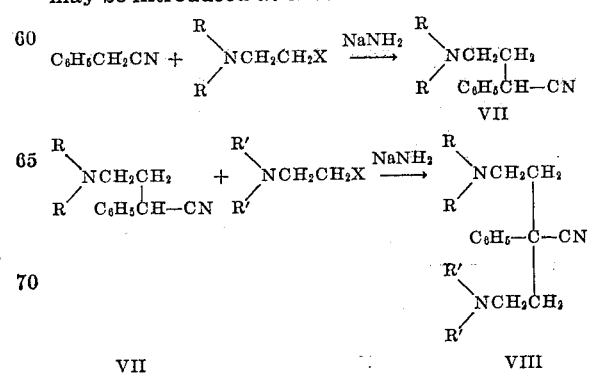

Hydrolysis of VIII to the carboxylic acid (IX)

can be accomplished by heating with approximately 70% sulfuric acid.

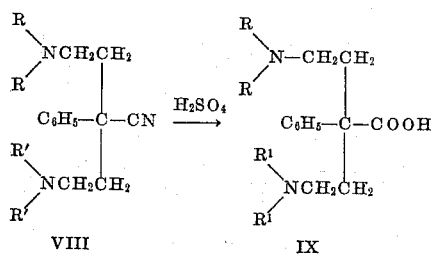

When the acid (IX) is converted to the acid chloride (IXa) using thionyl chloride and heated at the reflux temperature of the thionyl chloride (70-80° C.), cyclization occurs with elimination of R'Cl to give the pyrrolidone (VI).

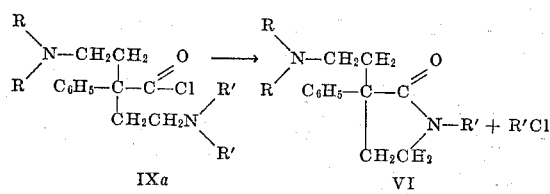

The compounds of Formula VIa are prepared in an analogous fashion starting with dialkylaminopropyl halides $R_2N$-$CH_2CH_2CH_2X$ and $R'_2CH_2CH_2CH_2X$ for the alkylation of phenylacetonitrile. When the corresponding disubstituted acetic acid is converted to its acid chloride (X) and this product is heated further, cyclization occurs with elimination of R'Cl to give the piperidone (VIa)

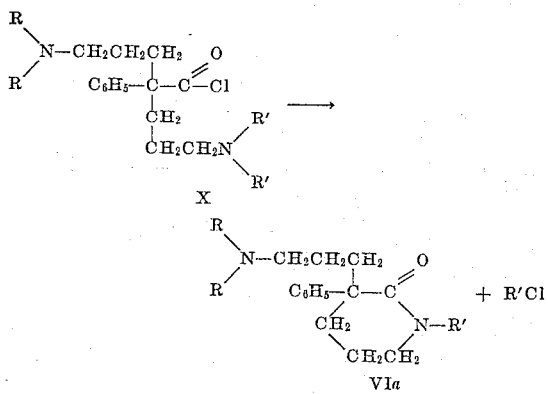

The disubstituted phenylacetonitriles and the corresponding phenylacetic acids described herein are described and claimed in the prior Lucas U. S. patent application, Serial No. 70,809, filed January 13, 1949 now U. S. Patent 2,510,784.

Another embodiment of our invention involves a new process for preparing 2-pyrrolidones substituted in the 3-position by a chloroaliphatic group. It also embodies a new class 2-pyrrolidones which are useful as therapeutic agents and can be used as intermediates for the synthesis of compounds which possess physiological activity.

Our new process comprises reacting the chloride of a strong acid with a piperidine-4-carboxylic acid having a hydrocarbon radical attached to the 1-position thereof and heating the acid chloride thus formed to produce a 5-membered lactam.

We have found that when a piperidine-4-carboxylic acid derivative of the general Formula XI is heated with an acid chloride forming reagent and the resulting acid chloride (XIa) is heated further, a rearrangement takes place and a 3-chloroaliphatic-2-pyrrolidone (XIb) is produced

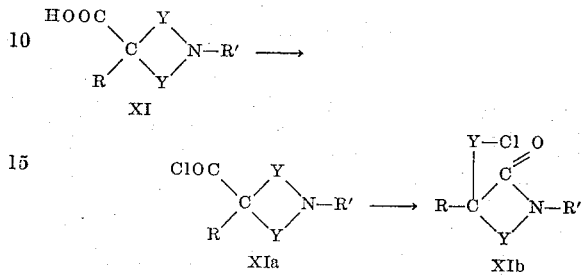

In these formulae, Y represents an ethylene radical, —$CH_2CH_2$—, in which one or more of the hydrogens may be substituted by groups not susceptible to reaction with acid chlorides or with the organic acid chlorides themselves. Such groups include hydrocarbon radicals, alkoxy, aryloxy, acyloxy, etc. R represents hydrogen or a hydrocarbon radical and R' is a hydrocarbon radical, preferably alkyl. For most practical purposes the carbon atom content of the hydrocarbon radicals will not exceed 18 carbon atoms each.

The reaction, in effect, involves a rupture of a carbon-nitrogen bond in the piperidine ring and addition of —CO—Cl to the ruptured bond. In other words, the divalent radicals, —Y— and —CO—, exchange places in the molecule.

The acid chloride forming reagents used are generally chlorides of strong acids, such as thionyl chloride, phosphorus trichloride, phosphorus pentachloride and oxalyl chloride. By a strong acid in this sense we mean an acid having a dissociation constant of at least about $10^{-3}$.

Our process is generally carried out as follows: The piperidine-4-carboxylic acid is warmed with an excess of an acid chloride forming reagent, preferably thionyl chloride or phosphorus trichloride, usually under reflux conditions until evidence of exothermic reaction has ceased. The excess acid chloride forming reagent is removed by evaporation, preferably at reduced pressure, and the residue, which comprises essentially a piperidine-4-carboxylic acid chloride, is heated to a temperature at which the residue has melted, but not exceeding 250° C. and preferably about 190-220° C. The desired lactam can be isolated by treatment with aqueous alkali which retains in solution any of the original carboxylic acid, allowing extraction of the lactam with ether or like solvent and ready purification of said lactam by fractionation.

Another aspect of our invention consists in new compounds produced by the process just described. These new compounds have the general formula

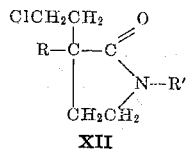

wherein R is hydrogen or a hydrocarbon group, in particular lower alkyl, aralkyl or aryl groups; and R' is a hydrocarbon group, preferably alkyl.

The preparation of these compounds is represented in the following manner:

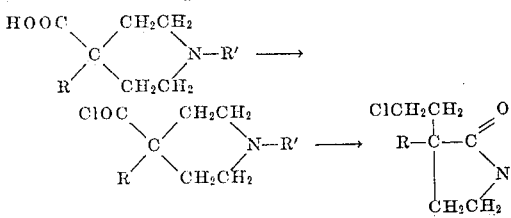

A specific example is 1-methyl-3-phenyl-3-(beta-chloroethyl)-2-pyrrolidone as prepared by treatment of 1-methyl-4-phenylpiperidine-4-carboxylic acid with thionyl chloride and heating the resulting acid chloride.

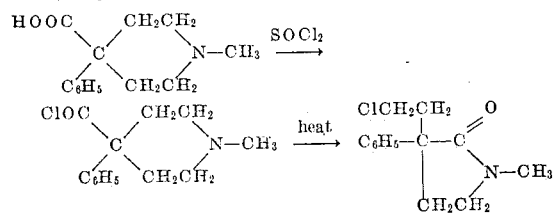

These chloroethyl compounds may be converted to basic pyrrolidones of the type of Formula VI by reaction with secondary dialkylamines. However, since any secondary amine can be employed, the scope of compounds is greater than that represented by Formula VI, said scope being more accurately encompassed by the following structure:

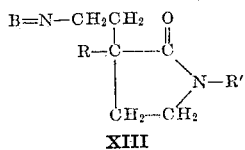

XIII

In Formula XIII, R and R' have the same meaning as before and B=N-represents a tertiary amino group such as dialkylamino, piperidyl, pyrrolidyl or morpholinyl.

The following flow sheet will illustrate this reaction, starting with N-benzyl-4-phenylpiperidine-4-carboxylic acid (XIV).

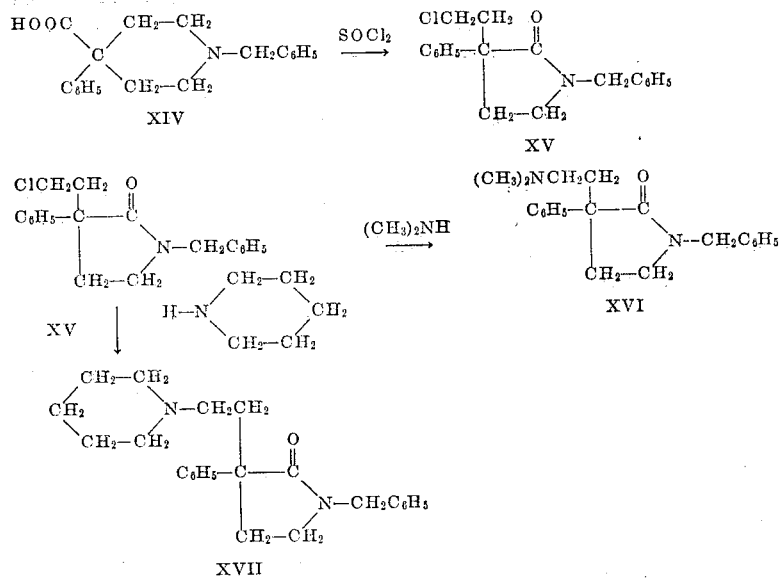

The process and products just described are disclosed and claimed in our divisional copending application Serial No. 71,214, filed January 15, 1949.

Still another embodiment of our invention relates to a new process for preparing 2-pyrrolidones substituted by an aliphatic group in the 1-position. It also embodies a new class of 2-pyrrolidones which are useful as therapeutic agents and can be used as intermediates for the synthesis of compounds which possess physiological activity.

Our new process comprises reacting with the chloride of a strong acid a carboxylic acid linked at the gamma position thereof to the ring nitrogen atom of a saturated nitrogen-heteromonocyclic group, and heating the resulting tertiary-amino carboxylic acid chloride whereby a 2-pyrrolidone is formed. A preferred embodiment is illustrated thus: in the carboxylic acid of Formula XIX, Y is a divalent hydrocarbon radical in which three carbon atoms intervene between the carboxyl group and the nitrogen atom, and X is a divalent bridge, preferably chosen from among —$CH_2$—, —$CH_2CH_2$—, and —$CH_2O$—. We have found that when an acid of this type is treated with an excess of a reagent of the type commonly used to prepare acid chlorides and heated at the boiling temperature of said reagent, the acid chloride (XIXa) is transformed into a 2-pyrrolidone (XIXb).

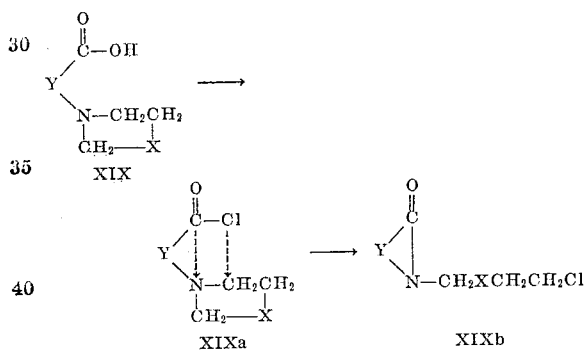

The heterocyclic ring of the acid (XIX) is preferably symmetrical in nature and X is defined in such a way that this will be the case. The heterocycles thus encompassed include piperidine, pyrrolidine and morpholine.

The acid chlorides are formded by treatment of the corresponding carboxylic acid with the chloride of a strong acid, i. e., an acid having a dissociation constant of at least about $10^{-3}$. Such chlorides of strong acids include thionyl chloride, phosphorus trichloride, phosphorus pentachloride and oxalyl chloride. Formation of the acid chloride takes place at room temperature or slightly above and is driven to completion by heating. In preparing the 2-pyrrolidones, the acid chloride need not be isolated since the rearrangement reaction takes place at or below the reflux temperature (70–80° C.) of the acid chloride forming reagent. Therefore, the overall reaction can be carried out simply by mixing the carboxylic acid with the acid chloride forming reagent (preferably thionyl chloride or phosphorus trichloride) and gradually heating the mixture to a condition of reflux. Refluxing for one or two hours completes the reaction.

Our new process affords a way of preparing a new class of compounds useful as pharmaceuticals, and as intermediates for the preparation of other useful compounds. This new class of compounds has the general structure

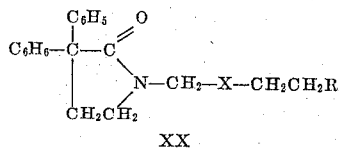

XX wherein, as before, X is a divalent bridge, chosen from the following; —CH₂—, —CH₂CH₂—, and —CH₂O—; and R is chlorine or tertiary-amino. In other words, they are 3,3-diphenyl-2-pyrrolidones substituted in the 1-position by an aliphatic group of the particular type depicted.

The necessary intermediates are prepared as follows. Diphenylacetonitrile is alkylated, in the presence of a strong base such as sodium amide, with the appropriate beta-(N-heteryl)-ethyl halide to give a 2,2-diphenyl-4-(N-heteryl)-butanenitrile (XXI).

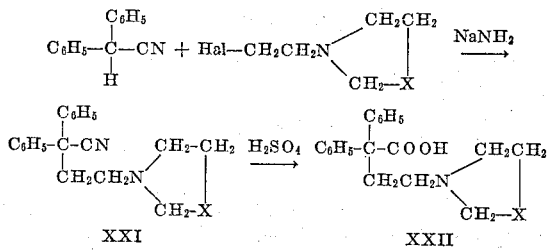

The halides which may be used include beta-(N-piperidyl)-ethyl, beta-(N-morpholinyl)-ethyl and beta-(N-pyrrolidyl)-ethyl halides.

The 2,2-diphenyl-4-(N-heteryl)-butanenitrile (XXI) is then hydrolyzed by the action of approximately 70% aqueous sulfuric acid to the corresponding butanoic acid (XXII).

This acid is converted to the desired 2-pyrrolidone (XXIII) where R is chlorine by employing our new process just described. Reaction between the 2,2-diphenyl-4-(N-heteryl)-butanoic acid (XXII) and an acid chloride forming reagent (preferably thionyl chloride or phosphorus trichloride) starts at about 30° C. with facile formation of the acid chloride (XXIIa). When the initial vigorous reaction has slowed down, heating of the reaction mixture to the reflux temperature of the reagent, which is present in excess, completes the formation of the acid chloride and initiates the rearrangement to the 2-pyrrolidone (XXIII), which rearrangement is complete in a few hours.

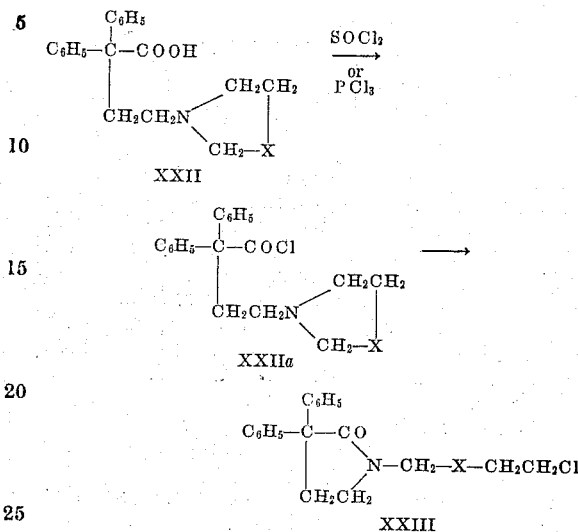

The N-chloroaliphatic-3,3-diphenyl-2-pyrrolidones thus formed are readily converted to the corresponding tertiary-aminoaliphatic derivatives by heating the chloro compound with a secondary amine, preferably a dialkylamine or a saturated heterocyclic amine, in a bomb or a sealed tube at 100° C., preferably in the presence of an inert solvent such as benzene. A closed system is necessary when a lower dialkylamine is used, because of the high volatility of the latter. Examples of amines that may be used are dimethylamine, ethylmethylamine, diethylamine, ethylpropylamine, dipropylamine, dibutylamine, diamylamine, piperidine, pyrrolidine, morpholine, etc. For instance, the secondary amines just named, when condensed with 1-(5'-chloropentyl)-3,3-diphenyl-2-pyrrolidone give respectively the following compounds: 1-(5' - dimethylaminopentyl)-; 1-(5'-ethylmethylaminopentyl)-; 1-(5'-diethylaminopentyl)-; 1-(5' - ethylpropylaminopentyl)-; 1-(5' - dipropylaminopentyl)-; 1-(5'-dibutylaminopentyl)-; 1-(5' - diamylaminopentyl)-; 1-[5'-(N - piperidyl)-pentyl]-; 1-[5'-(N-pyrrolidyl)-pentyl]-; and 1-[5'-(N - morpholinyl)-pentyl]-3,3 - diphenyl-2 - pyrrolidone. The process and products just described are disclosed and claimed in our divisional copending application Serial No. 71,213, filed January 15, 1949.

Many of the substances of our invention are basic and therefore can be converted to quaternary ammonium salts or to salts derived from addition of acids. Acid addition salts can be made by reaction of the free base with inorganic acids such as hydrochloric acid, hydrobromic acid, hydriodic acid, sulfuric acid and sulfamic acid; and organic acids such as acetic acid, lactic acid, citric acid, tartaric acid and ethanesulfonic cid. Readily obtainable quaternary ammonium salts are those derived from lower alkyl and aralkyl esters of strong inorganic acids and organic sulfonic acids, such as methyl chloride, methyl bromide, methyl iodide, ethyl bromide, ethyl iodide, propyl bromide, propyl iodide, benzyl chloride, benzyl bromide, methyl sulfate, methyl benzenesulfonate, methyl p-toluenesulfonate, etc.

The following examples further illustrate our invention, but should not be construed as a limitation thereto.

Example 1

(a) 2-phenyl-2-(beta - diethylaminoethyl)-4-diethylaminobutanenitrile

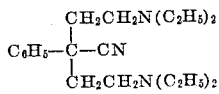

In a 2-liter, round-bottomed flask fitted with a stirrer, thermometer, and reflux condenser were placed 117 g. (1 mole) of benzyl cyanide, 305 g. (2.25 moles) of beta-diethylaminoethyl chloride, and 1 liter of toluene. This mixture was warmed to 50° C. and 97.5 g. (2.5 moles) of sodium amide was added in portions at such a rate that, with cooling, the temperature of the mixture was held between 50° and 70° C. The time for addition was approximately 45 minutes.

With stirring continued, the reaction mixture was refluxed for ten hours. It was then cooled and 75 ml. of alcohol was added to decompose any excess sodium amide. The toluene solution was decanted from a small solid residue, washed with two 150 ml. portions of saturated aqueous sodium chloride solution, and dried over anhydrous potassium carbonate.

The toluene and alcohol in the solution were removed by distillation with the aid of a water aspirator, and the residue was fractionated with the aid of an oil pump. The 256 g. portion boiling at 135–138° C. (0.08 mm.) was pure 2-phenyl-2-(beta - diethylaminoethyl) - 4 - diethylaminobutanenitrile. The yield was 81% of the theoretical amount.

Anal.—Amino nitrogen: Calcd., 8.88. Found, 8.69.

(b) 2-phenyl-2-(beta - diethylaminoethyl)-4-diethylaminobutanoic acid

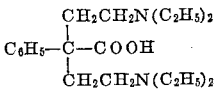

To a cold solution of 287 ml. of concentrated sulfuric acid in 196 ml. of water (70% sulfuric acid by weight) was added 196 g. (0.62 mole) of 2-phenyl-2-(beta-diethylaminoethyl) - 4 - diethylaminobutanenitrile. The resulting solution was heated at 145° C. (gentle reflux) for two hours, cooled, and poured into a mixture of 500 ml. of cracked ice and 750 ml. of water. This mixture was made strongly alkaline with 35% sodium hydroxide. The sodium salt of the amino acid separated partially at this point due to salting-out effects and was filtered off. The filtrate was adjusted to a pH of 7 with hydrochloric acid and the free amino acid which separated was filtered off, washed with water and dried. The sodium salt, separated above, was dissolved in a minimum amount of water and the pH adjusted to 7. The precipitated amino acid was filtered off, washed with water and dried. The total quantity of slightly impure 2-phenyl-2-(beta-diethylaminoethyl)-4-diethylaminobutanoic acid isolated thus was 174 g. or 84% of the theoretical amount. A sample, after one recrystallization from water, melted at 175–8° C. when heated from room temperature but when put into the bath at 165° C., the solid melted, resolidified, and then melted at 175–6° C.

Anal.—Nitrogen: Calcd., 8.39. Found, 8.21.

(c) 1 - ethyl-3-phenyl-3-(beta - diethylaminoethyl)-2-pyrrolidone

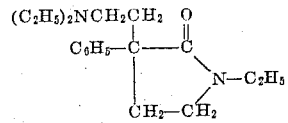

To 75 ml. (1 mole) of thionyl chloride cooled to 5–10° C. in a 300 ml. round-bottomed flask was slowly added with vigorous stirring 58 g. (0.17 mole) of 2-phenyl-2-(beta - diethylaminoethyl) - 4-diethylaminobutanoic acid. No reaction occurred. The flask was attached to a reflux condenser, and to the top of the latter were connected in series two scrubbers filled with 20% potassium hydroxide, a calcium chloride filled drying tube, and finally a test tube trap cooled by a Dry-Ice-methylene chloride mixture.

When the reaction mixture was heated to 25–30° C., acid chloride formation began. This reaction was completed below 60° C. At 70–80° C. ethyl chloride evolution began and 7.7 g. (70% of the theoretical amount) was collected. This product boiled at 12.5–13° C.; $n_D^{4.8}=1.3762$. An authentic sample showed $n_D^{4.8}=1.3761$. After the thionyl chloride solution had been refluxed (85–88° C.) for one and one-half hours, the reaction appeared complete.

The excess thionyl chloride was removed on a steam bath with the aid of an aspirator and the residue dissolved in water. This solution was made strongly alkaline and the pyrrolidone was extracted with ether. After drying the ether solution over anhydrous potassium carbonate and removing the ether, the residual liquid was fractionated and the 1-ethyl-3-phenyl-3-(beta - diethylaminoethyl)-2-pyrrolidone collected at 130–133° C. (0.07 mm.). The yield was 35 g. or 70% of the theoretical amount.

Its hydrochloride melted at 178–180° C.

Anal.—Calcd. for $C_{18}H_{29}ON_2Cl$: C, 66.54; H, 8.69; Cl, 10.92. Found: C, 66.77; H, 8.85; Cl, 10.76.

Example 2

(a) 2 - phenyl-2-(beta-dibutylaminoethyl)-4-dimethylaminobutanenitrile

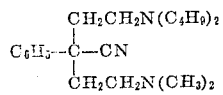

This compound was prepared by a method similar to that described in Example 1, part (a), except that it was necessary to carry out the alkylation in two steps since the two dialkylamino groups are different. Instead of a ratio of 1 mole of benzyl cyanide to 2.25 moles of dialkylaminoalkyl halide and 2.25 moles of sodium amide, the reaction was first carried out with a ratio of 1 mole of benzyl cyanide to 1.1 mole of beta-dimethylaminoethyl chloride and about 1.5 mole of sodium amide. The product, 2-phenyl-4-dimethylaminobutanenitrile, had the B. P. 100–102° C. (0.3 mm.); $n_D^{25}=1.5056$.

This product was in turn alkylated with 1.1 equivalents of beta-dibutylaminoethyl chloride (B. P. 114–115° C., 0.24 mm.) and about 1.5 equivalents of sodium amide. This gave the desired 2-phenyl - 2 - (beta-dibutylaminoethyl)-4-dimethylaminobutanenitrile, B. P. 148–152° C. (0.15 mm.); $n_D^{25}=1.4915$, in 75% yield.

Anal.—Amino nitrogen: Calcd., 8.16. Found, 8.24.

(b) 2 - phenyl-2-(beta-dibutylaminoethyl) -4-dimethylaminobutanoic acid

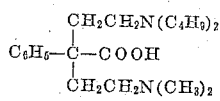

was prepared by the hydrolysis of 2-phenyl-2-(beta - dibutylaminoethyl) -4-dimethylaminobutanenitrile by the method described in Example 1, part (b). The hydrolysis mixture was refluxed for 40 hours. The melting point of the pure 2-phenyl-2-(beta-dibutylaminoethyl) -4-dimethylaminobutanoic acid was 197–198° C. and it was obtained in 62% yield.

Anal.—Nitrogen: Calcd., 7.73. Found, 7.64.

(c) 1-methyl - 3 - phenyl - 3 - (beta-dibutylaminoethyl) -2-pyrrolidone

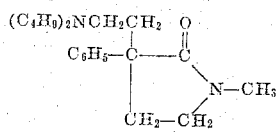

was prepared by the method described in Example 1, part (c). A mixture of 27 g. of 2-phenyl-2-(beta - dibutylaminoethyl) - 4 - dimethylaminobutanoic acid and 40 ml. of thionyl chloride, when heated, rapidly formed the acid chloride, and at 65° C. elimination of methyl chloride (B. P. —24° to —23° C.) began. The product boiled at 139–142° C. (0.04 mm.); $n_D^{25}$=1.5720; giving a 76% yield of 1-methyl-3-phenyl-3-(beta-dibutyl- Anal.—Calcd. for $C_{21}H_{34}ON_2$: C, 76.31; H, 10.37; N, 4.24. Found: C, 76.21; H, 10.32; N, 4.34.

*Example 3*

(a) 2-phenyl-2-(gamma-diethylaminopropyl) - 5-diethylaminopentanenitrile

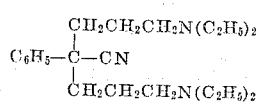

was prepared by the method described in Example 1, part (a), starting with benzyl cyanide and gamma-diethylaminopropyl chloride. The product was obtained in 80% yield and had the B. P. 172–175° C. (0.03 mm.); $n_D^{25}$=1.4940.

Anal.—Nitrogen: Calcd., amino, 8.15. Found, 8.28.

(b) 2-phenyl-2-(gamma-diethylaminopropyl) - 5-diethylaminopentanoic acid was prepared by the hydrolysis of 2-phenyl-2-(gamma-diethylaminopropyl) -5 - diethylaminopentanenitrile by the method of Example 1, part (b). The reaction was heated for 65 hours. The acid product, obtained in 76% yield, had the M. P. 102–105° C.

Anal.—Nitrogen: Calcd., 7.73. Found, 7.59.

Its di-hydrochloride had the M. P. 127–130° C.

Anal.—Chlorine: Calcd., 16.24. Found, 15.97.

(c) Ethyl 2-phenyl-2-(gamma-diethylaminopropyl) -5-diethylaminopentanoate

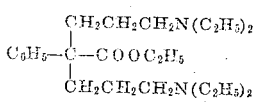

A mixture of 30 ml. of thionyl chloride and 15 g. of 2-phenyl-2-(gamma-diethylaminopropyl) -5-diethylaminopentanoic acid was refluxed for one hour. The excess thionyl chloride was removed at reduced pressure, and the residue of acid chloride was refluxed with 75 ml. of alcohol for one hour. The excess alcohol was removed, the residue dissolved in water and the solution made alkaline and the oily product extracted with ether. After drying over anhydrous potassium carbonate, the ether was removed and the product distilled giving 11.2 g. (70%) of the ethyl ester of 2-phenyl-2-(gamma-diethylaminopropyl) -5-diethylaminopentanoic acid, B. P. 149–151° C. (0.05 mm.); $n_D^{25}$=1.4902.

Anal.—Calcd. for $C_{24}H_{42}N_2O_2$: N, 7.18. Found: N, 7.35.

(d) 1-ethyl-3-phenyl - 3 - (gamma-diethylaminopropyl) -2-piperidone

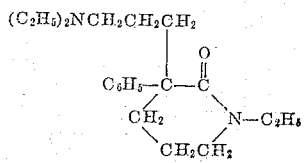

A mixture of 25 g. of the di-hydrochloride of 2-phenyl-2-(gamma-diethylaminopropyl) - 5-diethylaminopentanoic acid (see part b) and 50 ml. of thionyl chloride was refluxed for one hour. The excess thionyl chloride was removed at reduced pressure, and the residue was heated to 190–210° C. for one hour. Ethyl chloride gas was evolved. After cooling the residue was treated with an excess of dilute sodium hydroxide solution and extracted with ether. After drying the ether solution over anhydrous potassium carbonate and removing the ether, the residual liquid was fractionated and the product, 1-ethyl-3-phenyl-3-(gamma-diethylaminopropyl) -2-piperidone was collected at 142–145° C. (0.03 mm.); yield 13 g.

Anal.—Calcd. for $C_{20}H_{32}ON_2$: N, 8.84. Found: N, 8.78.

*Example 4*

(a) 2 - phenyl-2-(beta-diethylaminoethyl) -4-dimethylaminobutanenitrile

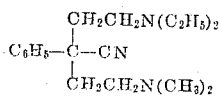

was prepared in a manner analogous to that described in Example 2, part (a). First benzyl cyanide was alkylated with beta-dimethylaminoethyl chloride to give 2-phenyl-4-dimethylaminobutanenitrile. This, in turn, was alkylated with beta-diethylaminoethyl chloride to produce the desired unsymmetrical nitrile in 58% yield, B. P. 124–131° C. (0.3 mm.); $n_D^{25}$=1.5018.

Anal.—Amino nitrogen: Calcd., 9.74. Found, 9.53.

(b) 1-methyl-3-phenyl-3-(beta-diethylaminoethyl) -2-pyrrolidone

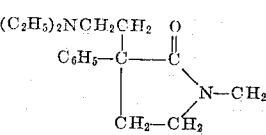

2 - phenyl - 2 - (beta-diethylaminoethyl) - 4 - dimethylaminobutanenitrile was hydrolyzed by the method described in Example 1, part (b). After two hours of heating an oily acid product was obtained in 85% yield which was used directly without further purification as follows. The crude 2-phenyl - 2 - (beta-diethylaminoethyl) -4-dimethylaminobutanoic acid (24 g.) was caused to react with 64 ml. of thionyl chloride in the manner described in Example 1, part (c). The alkyl halide which was expelled and collected in a Dry Ice trap was found to boil at —22° C. to 12° C. in such a proportion as to indicate the presence of about 75% methyl chloride and 25% ethyl chloride. This indicated that the final product consisted essentially of 1-methyl-3-phenyl-3-(beta-diethylaminoethyl) - 2 - pyrrolidone. It was obtained in 68% yield and boiled at 126–128° C. (0.03 mm.); $n_D^{52}$=1.5180.

Anal.—Calcd. for $C_{17}H_{26}ON_2$: C, 73.80; H, 9.29; N, 10.76. Found: C, 73.92; H, 9.52; N, 11.05.

*Example 5*

*1-ethyl-2-pyrrolidone.*—A mixture of 30 g. (0.15 mole) of gamma-diethylaminobutyric acid and 50 ml. of phosphorus trichloride was refluxed for 45 minutes in a 200 ml. round-bottomed flask connected to a condenser and gas collecting train as described in the preparation of the pyrrolidone in Example 1, part (c). No ethyl chloride was evolved. The excess phosphorus trichloride was removed by distillation under reduced pressure on a steam bath and the residue heated further while attached to the original system. At 145° C. ethyl chloride began to be evolved and the reaction appeared complete after it had been heated for one hour at 155–160° C.

The mixture was cooled somewhat and poured into 100 ml. of water with stirring. Complete solution occurred. This water solution was saturated with potassium carbonate and extracted five times with 75 ml. portions of ether. After the combined ether extracts were dried over potassium carbonate, the ether was distilled on a steam bath and the residue fractionated at atmospheric pressure. 1 - ethyl - 2 - pyrrolidone was obtained in 54% yield, B. P. 211–214° C. (784 mm.); $n_D^{25}$=1.4647.

*Example 6*

(a) *2 - phenyl - 4 - diethylaminobutanoic acid.*—A solution of 50 g. of 2-phenyl-4-diethylaminobutyronitrile [Eisleb, Ber. 74B, 1441 (1941)] in 250 ml. of concentrated hydrochloric acid was heated at reflux for eight hours. The reaction mixture was then made alkaline to phenolphthalein with 35% sodium hydroxide and heated on a steam bath until no more ammonia was evolved. The solution was then made neutral and evaporated to dryness. The water must be completely removed since the product is very soluble in water. The residue was then taken up in hot chloroform, the chloroform extract filtered free of salt, the chloroform evaporated and the residue taken up in hot benzene. Cooling gave 17 grams of solid, M. P. 90–92° C. The filtrate from this was evaporated and the residue allowed to stand two weeks. This residue had by this time crystallized to some extent. It was filtered free of oil, washed with benzene and combined with the first crops of crystals giving a total of 30 g. of acid. An additional benzene recrystallization of the combined product gave 26.5 g. of 2-phenyl-4-diethylaminobutanoic acid, M. P. 90–92° C. Several more benzene recrystallizations were necessary to give an analytically pure sample, M. P. 92–95° C.

Anal.—Nitrogen: Calcd., 5.95. Found, 5.70.

(b) 1-ethyl-3-phenyl-2-pyrrolidone was prepared in a manner similar to that described in Example 5. A mixture of 15 g. of 2-phenyl-4-diethylaminobutanoic acid and 50 ml. of phosphorus trichloride was refluxed for two hours. The excess phosphorus trichloride was removed at reduced pressure and the residue heated to 200° C. until evolution of gas ceased. The product was cooled, treated with water and extracted with ether. When the ether was dried and evaporated, the residue of 3.6 g. of oil gradually crystallized. When recrystallized from petroleum ether (B. P. 60–70° C.), a 30% yield of 1-ethyl-3-phenyl - 2 - pyrrolidone was obtained, M. P. 47–48° C.

Anal.—Calcd. for $C_{12}H_{15}ON$: C, 76.16; H, 7.97; N, 7.40. Found: C, 76.55; H, 7.57; N, 7.43.

*Example 7*

(a) 2,2 - diphenyl - 4 - diethylaminobutanenitrile was prepared by a method similar to that used in Example 1, part (a), the starting materials being diphenylacetonitrile and beta-diethylaminoethyl chloride in approximately equimolar quantities. The reaction of 108 g. of diphenylacetonitrile and 82 g. of beta-diethylaminoethyl chloride in the presence of 27 g. of sodium amide gave 140 g. (88%) of 2,2-diphenyl-4-diethylaminobutanenitrile, B. P. 163–167° C. (1–2 mm.); $n_D^{25}$=1.5490.

Anal.—Amino nitrogen: Calcd., 4.79. Found, 4.63.

(b) 2,2-diphenyl-4-diethylaminobutanoic acid was prepared by hydrolysis of 2,2-diphenyl-4-diethylaminobutanenitrile according to the method described in Example 1, part (b). The mixture was heated for 30 hours. The acid was obtained in 84% yield and had the M. P. 178–179.5° C.

Anal.—Nitrogen: Calcd., 4.49. Found, 4.43.

(c) 1 - ethyl - 3,3 - diphenyl - 2 - pyrrolidone was prepared according to the method described in Example 1, part (c). A mixture of 20 g. of 2,2-diphenyl-4-diethylaminobutanoic acid and 40 ml. of thionyl chloride, after 1.5 hours of reflux, give a 41% yield of 1-ethyl-3,3-diphenyl-2-pyrrolidone. After recrystallization of the product from high boiling petroleum ether it melted at 108–109° C.

Anal.—Calcd. for $C_{18}H_{17}ON$: N, 5.28. Found: N, 5.19.

*Example 8*

(a) 2,2 - diphenyl - 5 - diethylaminopentanenitrile was prepared according to the method of Example 1, part (a), starting with approximately equimolar proportions of diphenylacetonitrile and gamma-diethylaminopropyl chloride. The product was obtained in 75% yield and boiled at 154–156° C. (0.15 mm.); $n_D^{25}$=1.5427.

Anal.—Amino nitrogen: Calcd., 4.57. Found, 4.62.

(b) 2,2 - diphenyl - 5 - diethylaminopentanoic acid was prepared by hydrolysis of 2,2-diphenyl-5-diethylaminopentanenitrile according to the method of Example 1, part (b). The reaction mixture was heated for 30 hours, and the acid was obtained in 67% yield with the M. P. 132.5–133° C.

Anal.—Nitrogen: Calcd., 4.30. Found, 4.12.

(c) *1 - ethyl - 3,3' - diphenyl - 2 - piperidone.*—In 35 ml. of cold thionyl chloride was dissolved 16 g. (0.05 mole) of 2,2-diphenyl-5-diethylaminopentanoic acid. This solution was refluxed for thirty minutes while attached to a train described earlier for the trapping of ethyl chloride. Acid chloride formation occurred but no ethyl chloride was evolved. Excess thionyl chloride was removed from the mixture by warming under vacuum and the residual liquid heated gradually to 150° C. at which point ethyl chloride began to be evolved. When the temperature was then raised to 175° C. over a period of twenty minutes the reaction appeared complete. The product was dissolved in ether, and the resulting solution washed with water and dried over potassium carbonate. The solvent was evaporated and the residue dissolved in alcohol, heated twice with charcoal, and recovered from the alcohol by evaporation of this solvent. This residue was recrystallized once from high-boiling petroleum ether and once from a methanol-water mixture, giving 1-ethyl-3,3-diphenyl-2-piperidone, M. P. 119–119.5° C.

Anal.—Calcd. for $C_{19}H_{21}NO$: C, 81.68; H, 7.57; N, 5.01. Found: C, 82.01; H, 7.32; N, 4.88.

Example 9

(a) 2,2-diethyl-4 - diethylaminobutanoic acid was prepared by hydrolysis of 2,2-diethyl-4-diethylaminobutanenitrile [Ziegler and Ohlinger, Ann. 495, 109 (1932)] according to the method described in Example 1, part (b). The reaction mixture was heated for 60 hours. The crude amino acid was purified by conversion to the hydrochloride of the amino acid as follows. The sodium salt of the amino acid was dissolved in dilute hydrochloric acid and the solution evaporated nearly to dryness. Alcohol was then added and the mixture filtered to remove precipitated inorganic salts. The alcohol was evaporated and the residue boiled with ethyl acetate which was decanted while hot. The residue crystallized partially on chilling and standing. It was filtered and the somewhat sticky solid dried under vacuum. Finally trituration of the solid with acetone gave a product melting at 145–147° C., of sufficient purity for use in the next reaction. The melting point of the pure hydrochloride of 2,2 - diethyl- 4 - diethylaminobutanoic acid was 149–151° C.

Anal.—Chlorine: Calcd., 16.50. Found, 16.69.

(b) 1,3,3-triethyl-2-pyrrolidone was prepared according to the method of Example 1, part (c). A mixture of 16 g. of the hydrochloride of 2,2-diethyl-4-diethylaminobutanoic acid and 80 cc. of thionyl chloride gave a 48% yield of 1,3,3-triethyl-2-pyrrolidone, B. P. 60–61° C. (0.23 mm.); $n_D^{25}=1.4601$.

Anal.—Calcd. for $C_{10}H_{19}ON$: N, 8.28. Found: N, 8.12.

Example 10

(a) *Delta-diethylaminovaleric acid hydrochloride.*—A mixture of 48.4 g. (0.177 mole) of ethyl alpha-(gamma-diethylaminopropyl) - malonate [Marvel et al., J. Am. Chem. Soc. 49, 2299–2303 (1927)] in 100 ml. of water and 25 ml. of alcohol was refluxed for two hours. The resulting solution was made strongly acid with concentrated hydrochloric acid and refluxed for ten hours to effect decarboxylation of the malonic acid intermediate. This solution was evaporated to give a paste which was heated with 200 ml. of alcohol and cooled. The sodium chloride was filtered off and the filtrate evaporated to give an oil which gradually solidified to a mush after standing for a week. After stirring with 50 ml. of acetone the product was filtered. Addition of ether to the filtrate precipitated a further quantity of solid. The total solid product was recrystallized from a benzene-alcohol mixture and dried at 80° C. Delta-diethylaminovaleric acid hydrochloride, (15 g.) (40%) was obtained, M. P. 195–199° C.

(b) 1-ethyl-2-piperidone was prepared by the general method described for the preparation of 1-ethyl-2-pyrrolidone in Example 5. The product obtained from the reaction of delta-diethylaminovaleric acid hydrochloride and phosphorus trichloride was heated at 190–200° C. before ethyl chloride was evolved. When worked up as usual, a product, B. P. 120–122° C. (27 mm.) was obtained in 20% yield. Its hydrochloride had the M. P. 107–108° C. This product, 1-ethyl-2-piperidone is reported to boil at 109° C. (12 mm.) and its hydrochloride to melt at 108° C. [C. Räth, Ann. 489, 107–18 (1931)].

Example 11

(a) 3-(beta-chloroethyl)-1-methyl-3 - phenyl-2-pyrrolidone

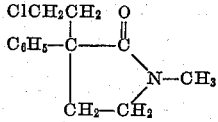

To 75 cc. of thionyl chloride cooled in an ice bath was added slowly 30 g. (0.14 mole) of 1-methyl-4-phenylpiperidine - 4 - carboxylic acid [Eisleb, Ber. 74B, 1433 (1941)]. The mixture was refluxed for thirty minutes, the excess thionyl chloride removed under vacuum on a steam bath, and the residue was heated to 200° C. for two and one-half hours. The residue melted at 175–180° C. to a dark colored liquid. At the end of the heating period the product was poured into a small amount of water and extracted with ether, and the extracts were dried over anhydrous potassium carbonate. After removal of the solvent, fractionation of the residue gave 23.5 g. of 3-(beta-chloroethyl)-1-methyl - 3 - phenyl - 2-pyrrolidone, B. P. 158–160° C. (0.22 mm.); $n_D^{25}=1.5538$. The yield was 72% of the theoretical amount.

Anal.—Calcd. for $C_{13}H_{16}ONCl$: Cl, 14.93; N, 5.88. Found: Cl, 14.59; N, 5.82.

(b) 3-(beta-dimethylaminoethyl)-1 - methyl-3-phenyl-2-pyrrolidone

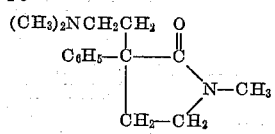

was prepared in 81% yield by heating a solution of 3 - (beta - chloroethyl)-1-methyl-3-phenyl-2-pyrrolidone and an excess of dimethylamine in benzene in a bomb at 100° C. for ten hours with shaking. After removal of the solvents the residual product boiled at 137–138° C. (0.25 mm.); $n_D^{25}=1.5364$, and upon cooling crystallized to a solid with the M. P. 66.5–68° C.

Anal.—Calcd. for $C_{15}H_{22}ON_2$: C, 73.11; H, 9.00; N, 11.37. Found: C, 73.34; H, 9.08; N, 11.32.

Example 12

(a) 3 - (beta - chloroethyl) - 1 - benzyl - 3-phenyl-2-pyrrolidone

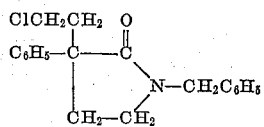

was prepared by a method similar to that described in Example 11, part (a), and starting with 1 - benzyl-4-phenylpiperidine-4-carboxylic acid [Eisleb, Ber. 74B, 1433 (1941)]. The product boiled at 184–187° C. (0.07 mm.); $n_D^{25}=1.5790$.

Anal.—Calcd. for $C_{19}H_{20}ONCl$: C, 72.72; Cl, 11.37; N, 4.46. Found: C, 72.72; Cl, 11.28; N, 4.66.

(b) 3-(beta-dimethylaminoethyl)-1 - benzyl-3-phenyl-2-pyrrolidone

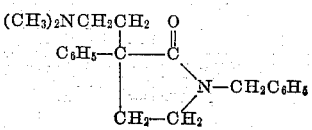

was prepared by a method similar to that described in Example 11, part (b). It was obtained in 79% yield, B. P. 192–193° C. (0.22 mm.); $n_D^{25}=1.5632$.

Anal.—Calcd. for $C_{21}H_{26}ON_2$: C, 78.23; H, 8.13; N, 8.68. Found: C, 78.20; H, 8.11; N, 8.65.

*Example 13*

(a) *1-methylpiperidine-4-carboxylic acid (N-methylisonipecotic acid)*.—A mixture of 125 g. (1.02 mole) of pyridine-4-carboxylic acid (isonicotinic acid), 400 ml. of glacial acetic acid, 300 ml. of water and 2.5 g. of platinum oxide catalyst was placed in an autoclave and subjected to a hydrogen pressure of 1000 pounds at room temperature. After 18 hours of shaking 75% of the theoretical amount of hydrogen had been absorbed. The autoclave was opened and 0.5 g. additional platinum oxide was added. The hydrogen atmosphere was restored and reduction continued until 90% of the theoretical amount of hydrogen had been taken up. The spent catalyst was removed by filtration, and the resulting solution of isonipecotic acid was methylated by treatment with 108 g. of 40% formaldehyde and palladium-on-charcoal catalyst (derived from 4.1 g. of palladous chloride and 33 g. of activated charcoal) in an atmosphere of hydrogen at high pressure and at room temperature. After the theoretical amount of hydrogen was absorbed, the catalyst was removed by filtration and the filtrate evaporated. After adding 100 ml. of concentrated hydrochloric acid to the filtrate, the solution was evaporated under reduced pressure on a steam bath to give a pasty solid. Trituration of this with 300 ml. of acetone gave 151 g. (82%) of N-methylpiperidine-4-carboxylic acid hydrochloride. Recrystallization from isopropyl alcohol gave a product melting at 223–225° C.

Anal.—Calcd. for $C_7H_{14}O_2NCl$: Cl, 19.74. Found: Cl, 20.15.

(b) 3 - (beta-chloroethyl) -1-methyl-2-pyrrolidone

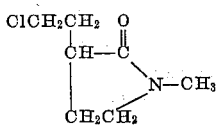

To 200 ml. of phosphorus trichloride cooled in an ice bath was added slowly 55.3 g. (0.306 mole) of 1-methylpiperidine-4-carboxylic acid (N-methylisonipecotic acid) hydrochloride. The mixture was refluxed for two hours with occasional interruption to break up the mass of solid. The excess phosphorus trichloride was then removed on a steam bath at reduced pressure. A white, granular solid resulted, which was refluxed for 45 minutes with 150 mls. of additional phosphorus trichloride. When this phosphorus trichloride was removed at reduced pressure a white powder remained. This residue was then heated gradually; it melted at 175° C., turned brown and began to effervesce. After heating at 200–220° C. for one hour, the product was cooled and dissolved in 100 ml. of water. This was made strongly alkaline by addition of sodium hydroxide solution and extracted six times with ether. The ether extracts were dried over anhydrous potassium carbonate and the ether was removed. The residual oil was fractionated at reduced pressure giving 11.6 g. of 3-(beta-chloroethyl)-1-methyl-2-pyrrolidone, B. P. 74–78° C. (0.14 mm.); $n_D^{25}=1.4901$.

Anal.—Calcd. for $C_7H_{12}ONCl$: Cl, 21.94; N, 8.67. Found: Cl, 21.32; N, 8.40.

*Example 14*

(a) 2,2 - diphenyl - 4 - N-(piperidyl)-butanoic acid

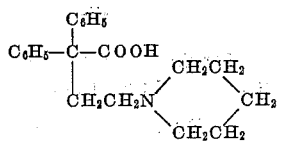

To a cold solution of 200 ml. of concentrated sulfuric acid in 135 ml. of water (70% sulfuric acid by weight) was added 120 g. of 2,2-diphenyl-4-N-(piperidyl)-butanenitrile (Bockmuhl and Ehrhart, U. S. Pat. 2,230,774), M. P. 73–74° C. The resulting solution was heated at 145° C. (gentle reflux) for 65 hours, cooled, and poured over cracked ice. The mixture was made strongly alkaline with 35% sodium hydroxide. The sodium salt of the amino acid separated partially at this point due to salting-out effects and was filtered off. The filtrate was adjusted to a pH of 7 with hydrochloric acid and the free amino acid which separated was filtered off, washed with water and dried. The sodium salt, separated above, was dissolved in a minimum amount of water and the pH adjusted to 7. The precipitated amino acid was filtered off, washed with water and dried. The total amount of slightly impure 2,2 - diphenyl - 4-N-(piperidyl)-butanoic acid isolated thus was 83 g. or 60% of theory, M. P. 227–230° C.

Anal.—Nitrogen: Calcd., 4.33. Found, 4.04.

(b) 1-(5'-chloropentyl)-3,3-diphenyl-2-pyrrolidone.

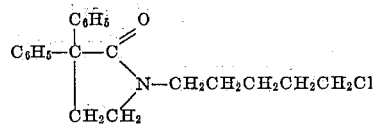

To 325 ml. of thionyl chloride cooled to 5–10° C. was added gradually with vigorous stirring 122 g. of 2,2-diphenyl-4-N-(piperidyl)-butanoic acid. As the mixture was gradually and carefully heated to a reflux temperature acid chloride formation occurred. After refluxing for three hours, the excess thionyl chloride was removed at reduced pressure and water was added to the residue. The product was extracted with ether, the ether solution washed with water and dried over anhydrous potassium carbonate. After evaporation of the ether, the product was fractionated twice at reduced pressure and the fraction boiling at 181–199° C. (0.31 micron) was collected ($n_D^{25}=1.5770$–$1.5802$), amounting to 55 g. (48%). When cooled, this oil crystallized. It was recrystallized twice from petroleum ether (B. P. 60–70° C). giving pure 1-(5'-chloropentyl)-3,3-diphenyl-2-pyrrolidone, M. P. 58–59° C. $n_D^{25}$ (supercooled liquid) $=1.5760$.

Anal.—Calcd. for $C_{21}H_{24}ONCl$: Cl, 10.39. Found: Cl, 10.42.

*Example 15*

1-(5'-dimethylaminopentyl - 3,3 - diphenyl - 2-pyrrolidone

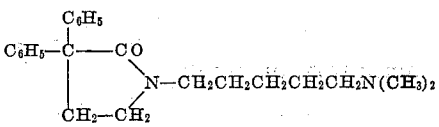

A solution of 20 g. of 1-(5'-chloropentyl)-3,3-diphenyl-2-pyrrolidone (Example 14) and 45 g. of dimethylamine in 130 ml. of benzene was heated in a bomb at 100° C. for ten hours with shaking. The contents of the bomb were then concentrated by distilling off part of the benzene and excess dimethylamine and the residue was extracted with dilute hydrochloric acid. The extracts were decolorized with charcoal and the basic product liberated by addition of 35% sodium hydroxide. This was extracted with ether, the ether extracts were washed with water and dried over anhydride potassium carbonate. After removal of the ether the product was distilled, giving 14 g. (70%) of 1-(5'-dimethylaminopentyl)-3,3-diphenyl-2-pyrrolidone, B. P. 197–198° C. (0.2 mm.); $n_D^{25}=1.5591$.

The hydrochloride was prepared by dissolving a sample of the free base in anhydrous ether saturated with anhydrous hydrogen chloride gas. The acid addition salt separated, was filtered and recrystallized first from isopropyl alcohol and then from benzene; M. P. 105–106° C.

Anal.—Calcd. for $C_{23}H_{31}ON_2Cl$: C, 71.39; H, 8.08; Cl, 9.16. Found: C, 71.61; H, 8.01; Cl, 8.93.

Example 16

1-(5'-diethylaminopentyl-3,3-diphenyl-2-pyrrolidone was prepared by the method described in Example 15, using diethylamine instead of dimethylamine. The product was obtained in about 60% yield, B. P. 190–196° C. (0.3 micron); $n_D^{25}=1.5504$.

Example 17

(a) 2,2-diphenyl - 4 - (N - pyrrolidyl)-butanenitrile.—A suspension of 15 g. of sodium amide in 200 ml. of dry benzene contained in a two liter, three-necked flask equipped with thermometer, dropping funnel and reflux condenser was warmed to 40° C., and 57.9 g. of diphenylacetonitrile dissolved in dry benzene was added in a dropwise manner with stirring. The mixture was then cooled to 10° C. and 43.5 g. of beta-(N-pyrrolidyl)-ethyl chloride was added dropwise with stirring. This was refluxed for one-half hour, cooled to 10° C. and 300 ml. of water was slowly added to decompose excess sodium amide. The benzene layer was separated and the aqueous layer extracted with benzene. The combined benzene extracts were washed with 300 ml. of 3 N hydrochloric acid, which was then made alkaline with 35% sodium hydroxide solution. The product which had separated as an oil was extracted with benzene, and the benzene solution was washed with water and dried over anhydrous calcium sulfate. After removal of the benzene, the product was distilled at reduced pressure through a 12" vacuum jacketed Vigreux column. The distillate crystallized and was recrystallized from petroleum ether (B. P. 60–70° C.) to give 71 g. (82%) of 2,2-diphenyl-4-(N-pyrrolidyl)-butanenitrile, M. P. 73.5–74.5° C.

Anal.—Nitrogen: Calcd., 4.85. Found, 4.85.

(b) 2,2-diphenyl - 4 - (N - pyrrolidyl)-butyric acid was prepared by hydrolysis of 2,2-diphenyl-4-(N-pyrrolidyl)-butanenitrile according to the method described in Example 14, part (a). The reaction mixture was heated for 65 hours. The acid melted at 204–205° C.

Anal.—Nitrogen: Calcd., 4.53. Found, 4.41.

(c) 1-(4 - chlorobutyl)-3,3-diphenyl-2-pyrrolidone was prepared according to the method of Example 14, part (b). A mixture of 27 g. of 2,2-diphenyl-4-(N-pyrrolidyl)-butyric acid and 40 ml. of thionyl chloride gave 18 g. (63%) of 1-(4'-chlorobutyl)-3,3-diphenyl - 2 - pyrrolidone, B. P. 200–210° C. (0.09 mm.); $n_D^{25}=1.5825$.

Anal.—Calcd. for $C_{20}H_{22}ONCl$: Cl, 10.82; N, 4.27. Found: Cl, 10.59; N, 4.21.

Example 18

1 - (4'-dimethylaminobutyl) - 3,3 - diphenyl-2-pyrrolidone was prepared according to the method of Example 15. A mixture of 18 g. of 1-(4'-chlorobutyl)-3,3-diphenyl-2-pyrrolidone and 50 g. of dimethylamine in benzene gave 13 g. (70%) of 1-(4'-dimethylaminobutyl) - 3,3 - diphenyl-2-pyrrolidone, B. P. 200–201° C. (0.2 mm.);

$n_D^{25}=1.5635$.

Anal.—Calcd. for $C_{22}H_{28}ON_2$: C, 78.51; H, 8.39; N, 4.16. Found: C, 78.38; H, 8.50; N, 4.18.

The hydrochloride was recrystallized from benzene and had the M. P. 160–161.5° C.

Example 19

(a) 2,2 - diphenyl - 4 - (N - morpholinyl) - butanenitrile

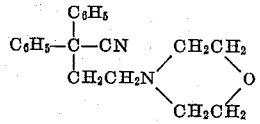

was prepared by a method similar to that described in Example 17, part (a). The reaction of 120.8 g. of diphenylacetonitrile and 98 g. of beta-(N-morpholinyl)-ethyl chloride in the presence of 30 g. of sodium amide gave 155.5 g. (79%) of product boiling over the range 130–190° C. (0.16–0.54 mm.).

(b) 2,2-diphenyl-4-(N-morpholinyl)-butanoic acid was prepared by hydrolysis of the crude 2,2-diphenyl - 4 - (N - morpholinyl)-butanenitrile of part (a) by the general method described in Example 14, part (a). The reaction mixture was heated for 70 hours. The pure acid was obtained in 57% yield and had the M. P. 216–217° C.

Anal.—Nitrogen; Calcd., 4.30. Found, 4.23.

(c) 1-[2'-(chloroethoxy)-ethyl]-3,3-diphenyl-2-pyrrolidone was prepared by a method similar to that described in Example 14, part (b). The reaction of 25.2 g. of 2,2-diphenyl-4-(N-morpholinyl)-butanoic acid and 35 ml. of thionyl chloride gave a 52% yield of 1-[2'-(chloroethoxy)-ethyl]-3,3-diphenyl - 2 - pyrrolidone having the formula

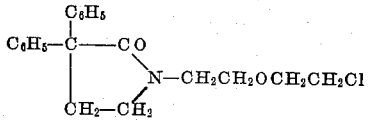

The fraction boiling above 184° C. (0.004 mm.) readily crystallized upon cooling. When recrystallized from alcohol it had the M. P. 70–78° C.

Anal.—Calcd. for $C_{20}H_{22}O_2NCl$: C, 69.85; H, 6.45; Cl, 10.31. Found: C, 69.85; H, 6.17; Cl, 10.10.

Example 20

1-[2'-(dimethylaminoethoxy)-ethyl] - 3,3 - diphenyl-2-pyrrolidone was prepared by the general method of Example 15. The reaction of 14 g. of 1-[2'-(chloroethoxy)-ethyl]-3,3-diphenyl-2-pyrrolidone and 45 ml. of dimethylamine gave 11.3 g. (78%) of 1-[2'-(dimethylaminoethoxy)-ethyl]-3,3-diphenyl-2-pyrrolidone, B. P. 175–183°

C. (0.1 mm.); $n_D^{25}$=1.5626 and having the formula

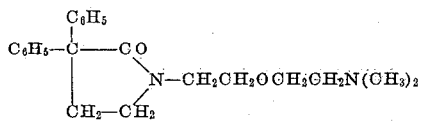

The hydrochloride was recrystallized from benzene and had the M. P. 125–127° C.

Anal.—Calcd. for $C_{22}H_{29}O_2N_2Cl$: C, 67.92; H, 7.25; Cl, 9.13. Found: C, 67.80; H, 7.50; Cl, 8.90.

We claim:

1. The method of preparing an N-alkyl-5-6-membered lactam which comprises reacting a chloride of a strong acid with a dialkylamino-carboxylic acid, wherein a saturated chain of 3–4 carbon atoms intervenes between the carboxyl carbon atom and the dialkylamino nitrogen atom, heating the dialkylamino-carboxylic acid chloride thus formed and isolating the resulting N-alkyl-5-6-membered lactam.

2. The method of preparing an alpha-(dialkylaminoalkyl) - N - alkyl - 5 - 6 - membered lactam which comprises reacting a chloride of a strong acid with an alpha,alpha - bis(dialkylamino-alkyl)-carboxylic acid, wherein a saturated chain of 3–4 carbon atoms intervenes between the carboxyl carbon atom and at least one of the tertiary-amino nitrogen atoms, heating the tertiary-amino-carboxylic acid chloride thus formed and isolating the resulting alpha - (dialkylaminoalkyl)-N-alkyl-5-6-membered lactam.

3. The method of preparing a 1-alkyl-2-pyrrolidone which comprises reacting a chloride of a strong acid with a gamma-dialkylamino-carboxylic acid wherein a saturated chain of three carbon atoms intervenes between the carboxyl group and the tertiary amino group of said gamma-dialkylamino-carboxylic acid, heating the tertiary-amino-carboxylic acid chloride thus formed and isolating the resulting 1-alkyl-2-pyrrolidone.

4. The method of preparing a 1-alkyl-2-piperidone which comprises reacting the chloride of a strong acid with a delta-dialkylamino-carboxylic acid wherein a saturated chain of four carbon atoms intervenes between the carboxyl group and the tertiary amino group of said delta-dialkyl-amino-carboxylic acid, heating the tertiary-amino-carboxylic acid chloride thus formed and isolating the resulting 1-alkyl-2-piperidone.

5. A process of preparing a 2-pyrrolidone of the formula:

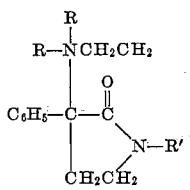

wherein R and R' are lower alkyl groups, which comprises reacting with a chloride of a strong acid, an acid of the formula

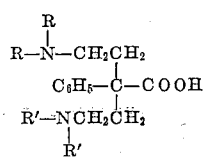

heating the tertiary-amino-carboxylic acid chloride thus formed and isolating the resulting 2-pyrrolidone.

6. A process according to claim 5 wherein the halide of the strong acid is a member of the group consisting of thionyl chloride and phosphorus trichloride.

7. A member of the group consisting of a compound of the formula

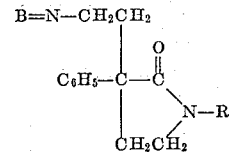

wherein B=N— is a tertiary-amino group and R is alkyl, and salts thereof.

8. A member of the group consisting of a compound of the formula

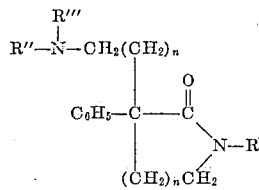

wherein R, R'' and R''' are alkyl radicals and $n$ is 1–2, and salts thereof.

9. A member of the group consisting of a compound of the formula

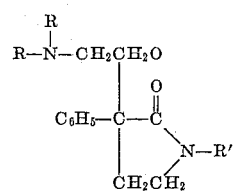

wherein R and R' are alkyl radicals, and salts thereof.

10. A member of the group consisting of 1-ethyl-3-phenyl - 3 - (beta-diethylaminoethyl)-2-pyrrolidone having the formula

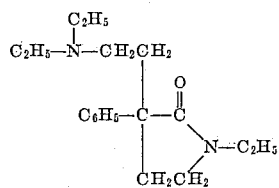

and salts thereof.

11. A member of the group consisting of 1-methyl-3-phenyl-3-(beta-diethylaminoethyl) - 2-pyrrolidone having the formula

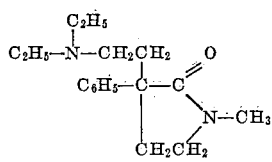

and salts thereof.

12. A member of the group consisting of 1-methyl-3-phenyl-3-(beta-dibutylaminoethyl)-2-pyrrolidone having the formula

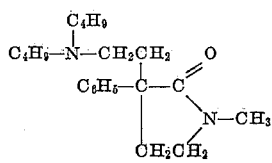

and salts thereof.

13. A member of the group consisting of 1-methyl-3-phenyl-3-(beta-dimethylaminoethyl)-2-pyrrolidone having the formula

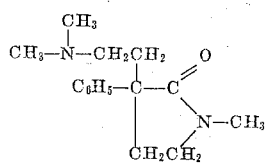

and salts thereof.

14. The method of preparing an N-alkyl-5-6-membered lactam which comprises reacting a halide of a strong acid with a dialkylamino-carboxylic acid wherein a saturated chain of 3-4 carbon atoms intervenes between the carboxyl carbon atom and the dialkylamino nitrogen atom, heating the dialkylamino-carboxylic acid halide thus formed and isolating the resulting N-alkyl-5-6-membered lactam.

15. A member of the group consisting of 1-ethyl-3-phenyl-3-(gamma-diethylaminopropyl)-2-piperidone having the formula

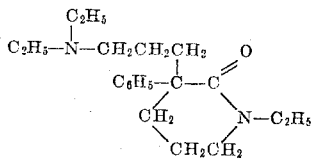

and salts thereof.

PHILIP LUCAS.
ROBERT L. CLARKE.
ARAM MOORADIAN.

REFERENCES CITED

The following references are of record in the file of this patent:

FOREIGN PATENTS

| Number | Country | Date |
|---|---|---|
| 501,135 | Great Britain | Feb. 21, 1939 |